Patented Feb. 3, 1953

2,627,477

UNITED STATES PATENT OFFICE 2,627,477

HIGHER ALKYL KETENE DIMER EMULSION

William F. Downey, Wilmington, Del., assignor to Hercules Powder Company, Wilmington, Del., a corporation of Delaware No Drawing. Application October 6, 1949, Serial No. 120,005

11 Claims. (Cl. 106—170)

This invention relates to an aqueous emulsion of a higher alkyl ketene dimer.

In the sizing of paper, it is conventional to employ a physical sizing agent such as, usually, rosin size and, occasionally, wax, asphaltic material or the like, such sizing agent being present in the finished product physically bonded to the surface of the fibers. In a copending patent application S. N. 120,002 by Gerald I. Keim and William Donald Thompson entitled "Sized Paper and Process for Preparing the Same" and filed concurrently herewith, it is disclosed that paper may be sized by the chemical treatment thereof with a higher organic ketene dimer. Now in accordance with the present invention, it has been found that this higher ketene dimer which, for the purpose, must be highly reactive with the hydroxyl groups of cellulose can be formed into aqueous emulsion with an emulsifying agent or an organic thickening agent. Thus, for example, the higher organic ketene dimer such as a higher alkyl ketene dimer is placed in aqueous solution with an emulsifying or thickening agent such as a soap, synthetic detergent or the like or, in the case of thickening agents, starch, water-soluble cellulose ethers such as water-soluble hydroxyalkyl cellulose, water-soluble alkyl cellulose, sulfoalkyl cellulose, and mixed water-soluble cellulose derivatives. This emulsion is particularly suitable as a composition for the sizing of paper inasmuch as it is readily miscible and dilutable with water and may be employed at any time with a cellulosic paper either wet or dry and, furthermore, is particularly valuable since it may be employed in the sizing of paper without the introduction of a solvent recovery product.

The general nature and form of the invention having been set forth, the following examples are presented in illustration but not in limitation of the invention.

Example 1

A solution was prepared from 75 parts by weight of water to 1 part by weight of the sodium salt of a carboxymethylcellulose having a carboxymethyl substitution of about 0.7 carboxymethyl group per anhydroglucose unit. This solution was placed in a Waring blender and there was added thereto 0.3 part by weight of decyl ketene dimer dissolved in 5 parts of benzene, and the mixture was beaten for 3 minutes. The resulting primary emulsion was then diluted with water to 600 parts by volume yielding an emulsion containing 0.05% ketene dimer and about 0.16% carboxymethylcellulose. This emulsion was characterized by being relatively stable against decomposition for a period of at least 4 weeks at 25° C., the stability being indicated by retention of its sizing properties at substantially the original level for this period of time.

Waterleaf handsheets of bleached sulfite pulp were prepared with a basis weight of 40 lb. per ream and were wet with the emulsion by immersion therein, and the excess emulsion was removed by pressing the wet sheet on a glass plate with a hard rubber roller. The emulsion was retained in the paper in an amount of about 200% based on the dry weight of the sheet to yield a paper containing 0.1% ketene dimer based on the weight of fiber. The thus-treated handsheets were oven dried for 10 minutes at 120° C., yielding a paper highly resistant to penetration by water, ink, etc., but still characterized by a relatively easily wettable (by water) surface, as indicated by a low contact angle.

Example 2

The procedure of Example 1 was repeated using as the ketene dimer, in separate preparations, the decyl ketene dimer of Example 1 and also hexadecyl ketene dimer, and employing as the organic thickening agent, in separate preparations, a carboxymethylcellulose having a degree of substitution of about 0.7 carboxymethyl groups per anhydroglucose unit, and starch in an amount to yield an aqueous emulsion containing 1% starch. In each case, the product was a smooth, aqueous emulsion characterized by the absence of observable large particles and characterized by stability against decomposition of the ketene dimer for a period of at least 4 weeks at 25° C.

Example 3

The procedure of Example 1 was repeated employing 0.05% hexadecyl ketene dimer and 2% of a commercial soap as emulsifying agent. A stable emulsion resulted, characterized by stability against decomposition of the ketene for a period of about 4 weeks at 25° C., the stability being indicated by retention of the paper sizing properties of the composition at substantially the original level for this period of time.

Example 4

A solution was prepared by combining 35.73 parts by weight of hexadecyl ketene dimer, 7.76 parts of Span 40 (sorbitan monopalmitate), 7.76 parts of Tween 40 (a polyoxyalkylene derivative of sorbitan monopalmitate) and 48.75 parts of benzene and heating with agitation until clear, the temperature rising to about 55–60° C. Forty parts of this solution, cooled to 50–55° C., were added to 60 parts of water at about 45° C. and the resulting emulsion was placed in the Waring Blendor and the mixture beaten. The resulting emulsion was characterized by being relatively stable against decomposition for a period of at least 4 weeks at 25° C., the stability being indicated by retention of its size properties at substantially the original level for this period of time.

In accordance with this invention, it has been found that the ketene dimer such as the dimer of monalkyl ketene having a carbon chain between about 6 and about 20 carbon atoms may be prepared in aqueous emulsion and is characterized by stability against decomposition of the ketene dimer for a long period of time in spite of the fact that the ketene dimer in the emulsion is characterized by reactivity toward cellulosic hydroxyl groups. The composition prepared according to this invention comprises an aqueous emulsion of the ketene dimer preferably within the range of molecular weight and structure herein set forth. It will be appreciated that the emulsifying agents operable in this invention may be of either the ionic or nonionic type. Thus, for example, sorbitan monopalmitate, polyoxyalkylene derivatives of sorbitan monopalmitate, polyoxyalkylene derivatives of rosin, rosin amine, hydroabietyl alcohol and the like, are representative nonionic emulsifying agents which are operable in this invention and ionic emulsifying agents such as, for example, the various soaps, synthetic detergents, and the like, as well as thickening agents such as starch and water-soluble cellulosic derivatives, and the like, are also operable. For the purpose of sizing paper, which is one of the ultimate processes to which the composition may be applied, the effectiveness of the emulsion as containing organic thickening agents such as, for example, starch, cellulose derivatives, or the like, is particularly surprising inasmuch as the ketene dimer which exhibits reactivity toward the carbohydrate cellulose molecule of the paper fibers is at the same time substantially unreactive both toward the hydroxyl groups of the aqueous medium and toward the hydroxyl groups of a carbohydrate thickening agent.

The relative proportions and concentration of the ketene dimer and the emulsifying agent or thickening agent may be varied as desired, depending principally on the ultimate use contemplated for the composition. Thus, for example, there may be prepared a relatively concentrated emulsion where the use of comparatively large quantities of the active agent or agents may be desired or such concentrated emulsion may be prepared for transportation purposes with later dilution. However, for use in the treatment of cellulosic materials such as, for example, paper and the like, the composition will generally be employed in dilute form usually containing between about 0.01 and about 2.0% and preferably between 0.1 and about 0.6% and usually about ½% of the ketene dimer and an amount of an emulsifying agent sufficient to maintain the dimer in suspension or preferably an organic thickening agent in an amount up to about 100 parts of the thickening agent per part of the ketene dimer.

It will be understood that numerous modifications in proportions and components may be made within the ordinary skill of the art and that these modifications are understood to be within the scope of the invention. Thus, for example, the organic thickening agent according to the preferred embodiment of the invention may be any hydrophilic composition compatible with the ketene dimer and characterized by a rate of reaction with the ketene not disproportionately rapid in comparison with the rate of reaction between the ketene dimer and the cellulosic or other composition intended for the ultimate application of the new composition. Similarly, other soaps, detergents, wetting and dispersing agents, and the like, may be employed within this invention, and such compositions likewise are to be understood to be within the concept hereof.

What I claim and desire to protect by Letters Patent is:

1. As a new composition of matter an aqueous emulsion of a dimer of a higher alkyl ketene having a carbon configuration of at least 6 carbon atoms.

2. As a new composition of matter an aqueous emulsion of a dimer of a higher alkyl ketene having a carbon chain of 6 to 20 carbon atoms.

3. As a new composition of matter an aqueous emulsion of hexadecyl ketene dimer.

4. As a new composition of matter an aqueous emulsion of decyl ketene dimer.

5. As a new composition of matter an aqueous emulsion comprising, as the continuous phase, an aqueous solution of an organic thickening agent and, as the dispersed phase, a dimer of a higher alkyl ketene having a carbon configuration of at least 6 carbon atoms.

6. As a new composition of matter an aqueous emulsion comprising, as the continuous phase, an aqueous solution of an organic thickening agent and, as the dispersed phase, a dimer of a higher alkyl ketene having a carbon chain of 6 to 20 carbon atoms.

7. As a new composition of matter an aqueous emulsion comprising, as the continuous phase, an aqueous solution of a water-soluble cellulose ether and, as the dispersed phase, a dimer of a higher alkyl ketene having a carbon chain of 6 to 20 carbon atoms.

8. As a new composition of matter an aqueous emulsion comprising, as the continuous phase, an aqueous solution of starch and, as the dispersed phase, a dimer of a higher alkyl ketene having a carbon chain of 6 to 20 carbon atoms.

9. As a new composition of matter an aqueous emulsion comprising, as the continuous phase, an aqueous solution of a water-soluble cellulose ether and, as the dispersed phase, hexadecyl ketene dimer.

10. As a new composition of matter an aqueous emulsion comprising, as the continuous phase, an aqueous solution of a water-soluble cellulose ether and, as the dispersed phase, decyl ketene dimer.

11. As a new composition of matter an aqueous emulsion comprising, as the continuous phase, an aqueous solution of a nonionic emulsifying agent and, as the dispersed phase, a dimer of a higher alkyl ketene having a carbon configuration of at least 6 carbon atoms.

WILLIAM F. DOWNEY.

(References on following page)

REFERENCES CITED

The following references are of record in the file of this patent:

UNITED STATES PATENTS

| Number | Name | Date |
|---|---|---|
| 2,103,505 | Wiezevich et al. | Dec. 28, 1937 |
| 2,137,169 | Levey | Nov. 15, 1938 |
| 2,235,798 | Collings et al. | Mar. 18, 1941 |
| 2,238,826 | Sauer | April 15, 1941 |
| 2,241,700 | Davidson et al. | May 13, 1941 |
| 2,275,845 | Drake | Mar. 10, 1942 |
| 2,281,589 | Mitchell | May 5, 1942 |
| 2,321,270 | Bacon et al. | June 8, 1943 |
| 2,340,072 | Medl | Jan. 25, 1944 |

FOREIGN PATENTS

| Number | Country | Date |
|---|---|---|
| 522,204 | Great Britain | June 12, 1940 |